United States Patent [19]
Weener et al.

[11] Patent Number: 5,921,795
[45] Date of Patent: *Jul. 13, 1999

[54] FREESTANDING POWER AND/OR COMMUNICATION PEDESTAL

[75] Inventors: Robert C. Weener, Holland; Douglas R. Himebaugh, Fruitport, both of Mich.

[73] Assignee: Haworth, Inc., Holland, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/486,619

[22] Filed: Jun. 7, 1995

Related U.S. Application Data

[51] Int. Cl.⁶ .................................................. H01R 25/00
[52] U.S. Cl. .............................. 439/215; 174/48; 52/36.1
[58] Field of Search ..................... 52/36.1, 36.5; 174/48, 49; 439/215, 211

[56] References Cited

U.S. PATENT DOCUMENTS

| | | | |
|---|---|---|---|
| D. 366,865 | 2/1996 | Stringer | D13/142 |
| D. 370,622 | 6/1996 | Byrne | D8/356 |
| D. 372,018 | 7/1996 | Byrne | D13/143 |
| 3,856,981 | 12/1974 | Boundy | 174/48 |
| 4,230,900 | 10/1980 | Speet | 174/48 |
| 4,551,577 | 11/1985 | Byrne | 174/57 |
| 4,747,788 | 5/1988 | Byrne | 489/131 |
| 5,057,039 | 10/1991 | Persing et al. | 439/574 |
| 5,081,809 | 1/1992 | Thompson | 174/48 |
| 5,107,636 | 4/1992 | Schindele et al. | 52/27 |
| 5,116,235 | 5/1992 | Nienhuis et al. | 439/215 |
| 5,129,835 | 7/1992 | DeFouw et al. | 439/215 |
| 5,214,889 | 6/1993 | Nienhuis et al. | 439/215 |
| 5,226,705 | 7/1993 | Rorke et al. | 312/196 |
| 5,230,552 | 7/1993 | Schipper et al. | 312/223 |
| 5,277,006 | 1/1994 | Ruster | 174/48 |
| 5,329,650 | 7/1994 | Zaccai et al. | 4/605 |
| 5,351,173 | 9/1994 | Byrne | 362/127 |
| 5,438,937 | 8/1995 | Ball et al. | 108/64 |
| 5,452,807 | 9/1995 | Foster et al. | 211/26 |
| 5,548,086 | 8/1996 | Greenfield et al. | 174/48 |

OTHER PUBLICATIONS

ECA, Tech–File brochure, 1996 (4 pages).
Steelcase Inc. "Activity Products" brochure, 1993, (5 pages).

*Primary Examiner*—Gary Paumen
*Attorney, Agent, or Firm*—Flynn, Thiel, Boutell & Tanis, P.C.

[57] ABSTRACT

A freestanding power and/or communication pedestal for selective placement at locations near workstations. The pedestal includes two, spaced apart columns projecting upwardly from a base member toward a cross member and which thereby define an opening therebetween. Selected power and communication modules are seatable within the opening at one or more mounting sites defined along the axial length of the columns, which modules have receptacles for receiving connector plugs of workstation equipment. One column accommodates a communication cable therein, and the other column receives a power cable therein.

27 Claims, 7 Drawing Sheets

FREESTANDING POWER AND/OR COMMUNICATION PEDESTAL

FIELD OF THE INVENTION

The invention relates to a freestanding power and/or communication pedestal, which connects to power and communication systems of an office and, more specifically, to a freestanding pedestal for use with office furniture, particularly workstations, which pedestal is positioned near an associated workstation area and includes power and/or communication receptacles for connection to the equipment of the workstation.

BACKGROUND OF THE INVENTION

Commercial buildings typically provide large open floor areas intended for use as offices and the like, and the end user typically determines the most efficient use of the floor space for his own needs, and selects how the floor space is to be divided into smaller working spaces through the use of portable wall panels or the like. To optimize the usage of the space, most modern offices utilize what is conventionally referred to as "systems" furniture which includes modular wall panels and associated furniture components, such as desks, shelves and the like, for dividing large floor space areas into smaller workstations.

The use of modular furniture components provides significant flexibility in defining a wide range of sizes, shapes and locations for the workstation areas which, for example, may be arranged into separate, distinct areas or clustered into groups of office areas. Each individual workstation typically includes a number of communication and electrically powered components, such as computers, telephones, facsimile machines and the like, which may require connection to the electrical power system and/or the communications system of the office building. The communication system may further be divided into conductors which define voice links, such as is required for telephones, and data links, as used to interconnect computer terminals.

Typically the building cabling extends through floor spaces, ceiling clearance spaces, in the raceways of the furniture components, or combinations thereof. Connection of the workstation equipment to electrical power and to voice and data links is accomplished by supplying each workstation with a selected number of power and communications receptacles or outlets which are thereby connected to the power or communications cabling of the building. While powered furniture panels conveniently provide power to a workstation, the supply of outlets to a workstation becomes more difficult when non-powered panels are used or where workstations are set up without the use of panels.

In addition, depending upon the particular configuration of the workstations in the office area, the particular components used in each workstation, and the changing needs of the particular workstation, the allocation of power and/or communications outlets to each particular workstation or each cluster of workstations may vary. Still further, with the various types of office equipment and electrical and communications systems that are available for use in a workstation, which each may be incompatible with the other, the particular structure of the power and communication outlets may vary as the systems change.

In response to these needs, it is known to provide outlet posts which may be positioned proximate a workstation area to provide outlets, which outlets, for example, may be provided to supplement preexisting outlets or in place of providing outlets by the use of prewired furniture panels or components. These posts are themselves wired to the communications or power systems of the building, and include outlets which are accessible by the user of a workstation.

For example, one outlet post is a rectangular or triangular post which is positionable near a workstation and includes power and communication receptacles on the upper end thereof. The outlet post extends to a height proximate a worksurface height and the receptacles are mounted on the outward facing sides or faceplates thereof. More specifically, the receptacles are mounted within the interior of the posts and disposed so as to extend through openings formed in the faceplates in order to be accessible from the exterior. Connection to the cabling of the office is accomplished through the floor. These outlet posts, however, do not readily provide for the addition or removal of receptacles from the post to accommodate the fluctuating needs of the workstations since the faceplates are formed with a fixed number of faceplates openings through which the associated receptacles extend. In addition, separate receptacles are required on each side of the post.

In another outlet post, the post is an elongated pole which has a rectangular cross section so as to have four faceplates. The post extends from the floor to the ceiling and is supported therebetween. On the bottom end of the post, the faceplates are formed with a predetermined number of receptacles at predetermined locations thereon. Here again, a fixed number of faceplate openings are provided and separate receptacles are used on all four sides.

In still a further outlet post, the post extends to a worksurface height and has two vertically-hinged doors on the opposite ends of the post which open to expose two respective interior faceplates of the post. These two interior faceplates each include openings therethrough which open into a central portion. Receptacles are secured in the central portion and extend through the openings so as to permit access by workstation equipment at predetermined locations along the vertical length thereof. Here again, a fixed number of mounting apertures are provided in each panel which limits the size, shape and number of receptacles which may be provided.

Accordingly, to provide significant flexibility when providing receptacles to be accessed by selected workstations, it is an object of the invention to provide a freestanding pedestal which accommodates a selectable number of modular power and/or communication receptacles which are accessible from opposite sides of the pedestal to accommodate two or more different workstations. It is further desirable that the freestanding pedestal include an arch-like opening therethrough which receives a selected number of these power and/or communication modules or units.

It is a further object that such freestanding pedestals readily permit connection to the pre-wired power and communication systems of the building through any of the preexisting floor, ceiling or furniture component cabling systems. It is also an object of the invention to provide completely separate channels within the freestanding pedestal to separate power cabling from communications cabling and satisfy industry standards. Furthermore, it is an object that both the power and communication receptacles of the respective modules be positionable above and below each other so as to be accessible on the same side thereof while maintaining the separation of the power and communication cables within the pedestal of the invention.

According to the invention, a freestanding power and/or communication pedestal is provided that includes two, spaced apart upstanding columns projecting upwardly from a base member to distal ends thereof, which distal ends are spanned by a cross member and which thereby define an arch-like opening. A selected number and type of either power modules, communication modules or both are selectively seated within the opening at one or more mounting sites defined along the vertical axial length of the columns.

Each module includes opposite outward facing side surfaces which face outwardly away from the arch-like opening in which the module is mounted. Preferably, each opposite side surface permits access to an associated receptacle or outlet for receiving the plug of the equipment of an adjacent workstation and to allow connection of the plugs to the outlets on either side of the pedestal.

The columns include access openings therethrough which open interiorly into interior longitudinal channels within the columns and exteriorly toward said mounting sites within said arch-like opening. A power distribution cable is provided within one of the channels and a communication distribution cable is provided within the other of the channels so as to be respectively connected to each corresponding power or communication module as mounted within the arch-like opening. To facilitate extension of the cables to the cabling system of the building, the power and communication cables may extend out of the pedestal through a bottom of the base, a side of the base, a top of the pedestal or any other location which may prove desirable depending upon the particular path over which the cables are being extended.

Other objects and purposes of the invention will be apparent to persons familiar with structures of this general type upon reading the following specification and inspecting the accompanying drawings.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the pedestal and designated parts thereof. Said terminology will include the words specifically mentioned, derivatives thereof, and words of similar import.

DETAILED DESCRIPTION

Figure 1:
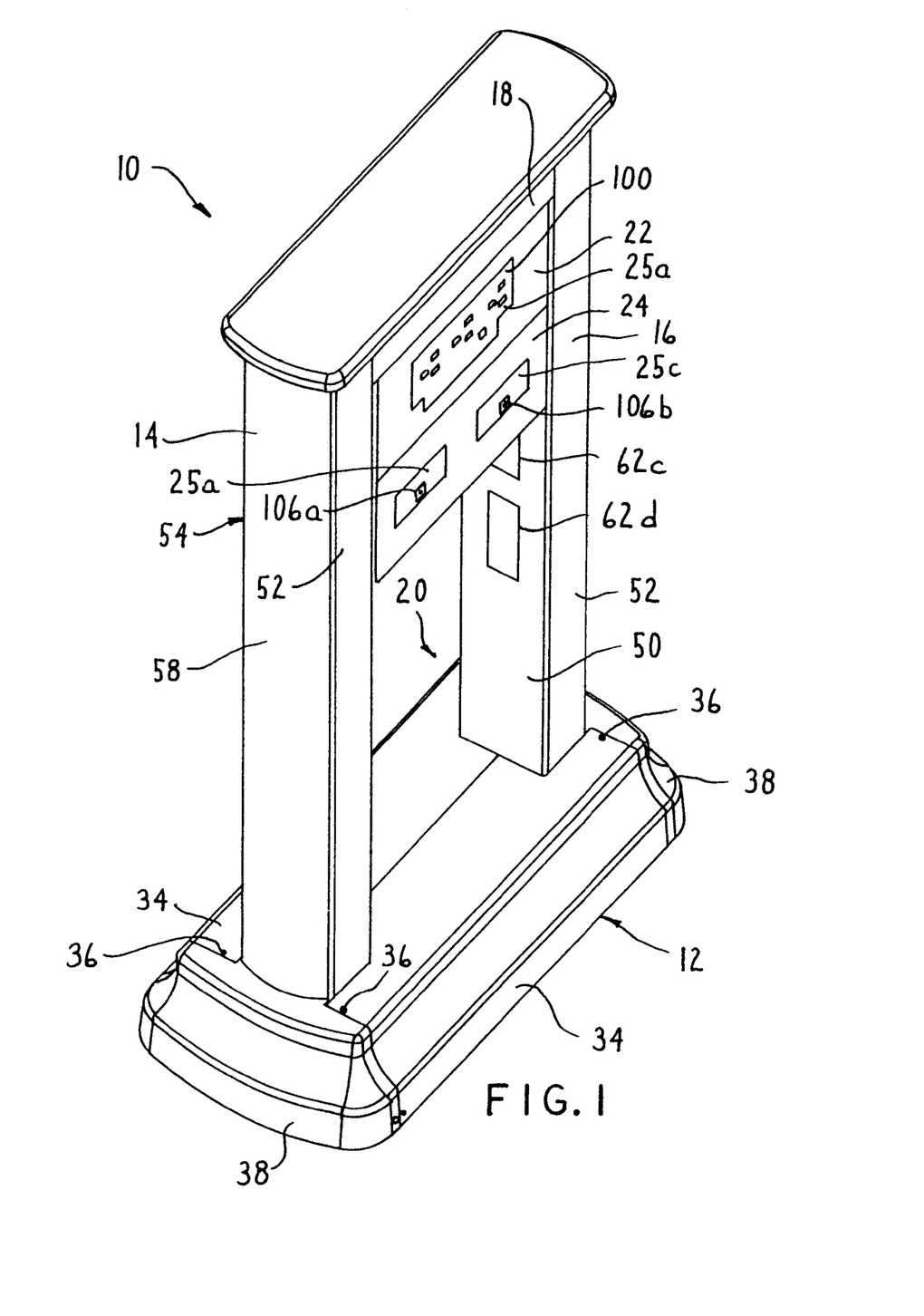
FIG. 1 is a pictorial view of a freestanding pedestal of the invention illustrating an arch-like module-receiving opening as well as a power module and a communication module disposed therein.
Figure 2:
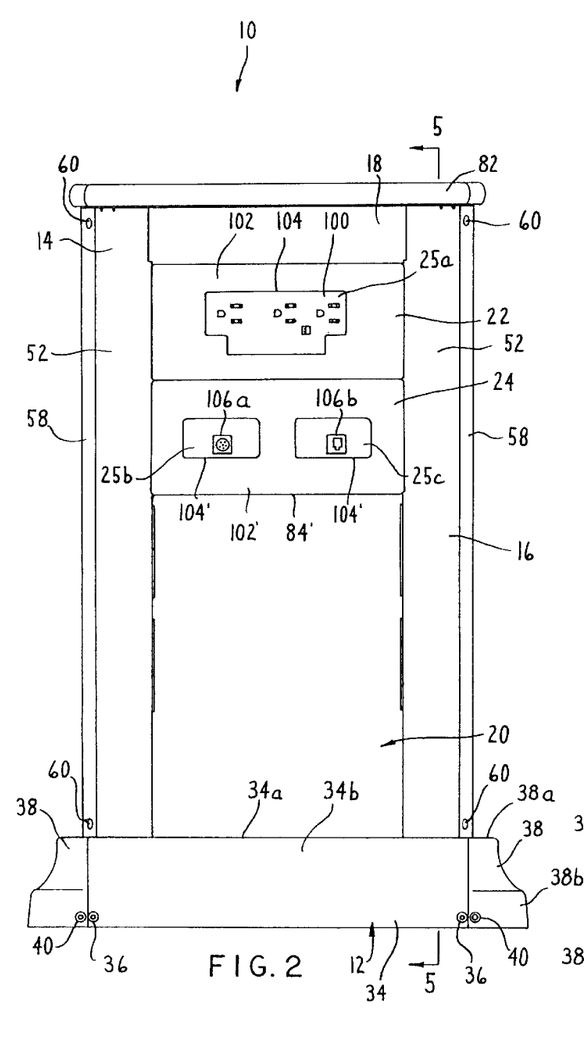
FIG. 2 is a front elevational view of the pedestal illustrating the power and communication modules and the respective receptacles thereof.
Figure 3:
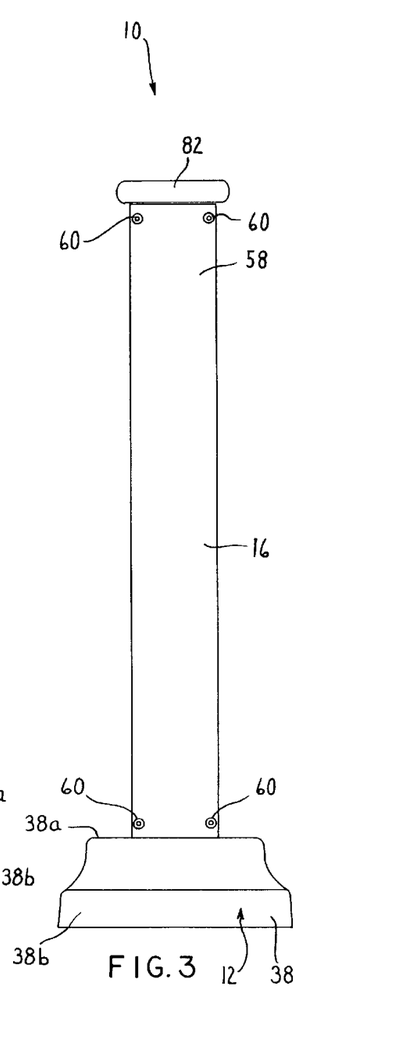
FIG. 3 is a side view of the pedestal of FIG. 2.

Referring to FIGS. 1–3, there is shown a power and/or communication pedestal 10, which is provided for connection to the power and communication cabling systems of an office building (not illustrated), and is selectively positioned on a support surface near a workstation (not illustrated). The pedestal 10 includes a base 12, a pair of spaced apart upstanding columns 14 and 16, and a top or transverse cross member 18 which extends laterally between the columns 14 and 16 to define a module-receiving arch-like opening or passage 20 therebetween. In addition, as can be seen in FIG. 2, one or more power modules 22 and/or one or more communication modules 24 are removably mounted within the opening 20 and have receptacles or outlets 25a–25c to which workstation equipment (not illustrated) may be connected.

Figure 4:
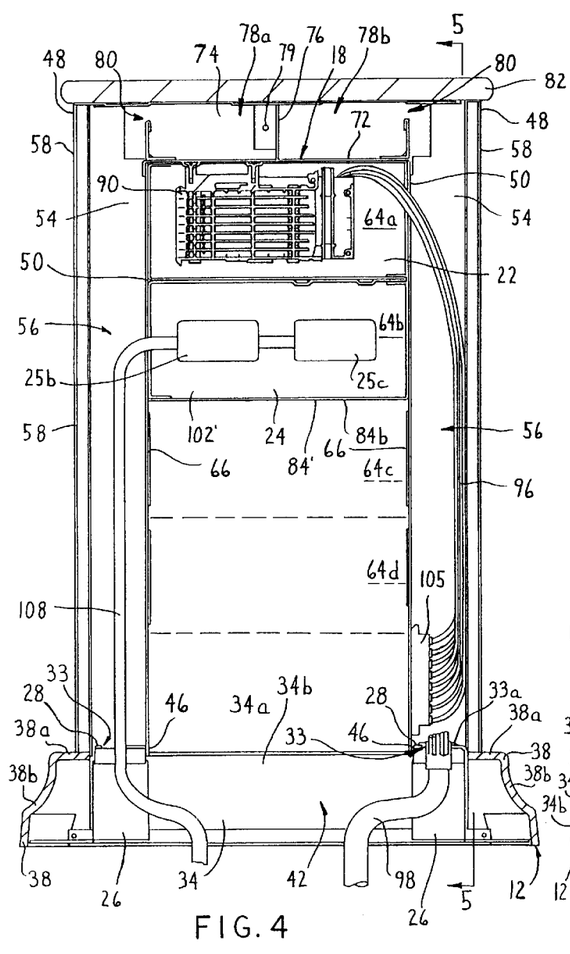
FIG. 4 is a front cross sectional view of the pedestal viewed generally along line 4—4 of FIG. 5 and illustrating separated power and communication cables exiting the base through the bottom thereof.
Figure 5:
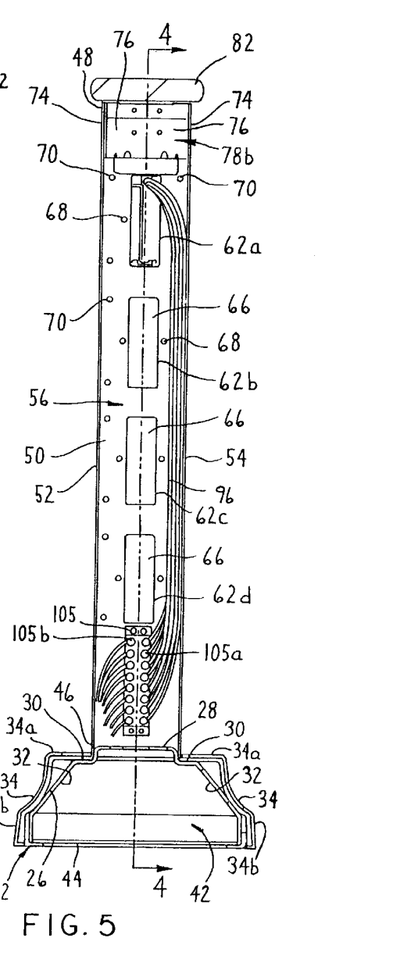
FIG. 5 is a side cross sectional view as viewed along line 5—5 of FIG. 4.

More specifically, as can be seen in FIGS. 4 and 5, the base 12 includes a pair of interior frame members 26 laterally spaced apart from one another. Each interior frame member 26 has a stepped U-shape which includes an upper portion 28 extending between two spaced apart stepped shoulders 30 and further includes two downwardly depending support legs 32. To permit the passage of cables within the interior of the pedestal 10, each upper portion 28 includes an aperture 33 extending therethrough.

Referring to FIGS. 2–5, the base 12 further includes base side covers 34 which face in opposite directions and extend laterally between the interior frame members 26. The base side covers 34 have a generally L-shaped cross section as can be seen in FIG. 5 so as to define a horizontal planar portion 34a which seats upon the respective shoulders 30 and a downwardly depending portion 34b. To enclose the downwardly depending support legs 32 of the interior frame members 26, the base side covers 34 are removably secured to the interior frame members 26 by fasteners 36 (FIG. 2) such as screws or the like.

To enclose the opposite ends of the base 12, base end caps 38 are fixedly secured to the interior frame members 26 by fasteners 40 (FIG. 2), such as screws. Each base end cap 38 preferably includes a horizontal planar portion 38a which is substantially flush with the horizontal planar portions 34a of the base side covers 34 when secured to the interior frame members 26. The base end caps 38 further include downwardly depending portions 38b which extend around from one side cover 34 to the other side cover 34 so as to define an interior chamber 42 within the base 12, which interior chamber 42 is provided to accommodate power and communication cabling as discussed in detail herein. The aforesaid components of the base 12 are formed of sheet metal formed into the desired shape. The skilled artisan will appreciate that other suitable material may be used so long as the desired structural strength and shape is provided thereby.

As shown in FIGS. 4 and 5, the columns 14 and 16 each have a proximal end 46 fixedly secured to the upper portion 28 of the interior frame members 26 of the base 12. The columns 14 and 16 project substantially vertically above the base 12 and are parallel one with respect to the other in spaced-apart relation. Each column 14 and 16 also includes a distal end 48 which is disposed a predetermined distance above the base 12. Preferably the distance between the proximal end 46 and the distal end 48 of the columns 14 and 16 is a sufficient distance so as to project upwardly to a height (which is similar to a typical worksurface height). It will be appreciated, however, that the length of the columns 14 and 16 can be varied depending upon the desired height requirements of the workstation and the desired size of the module-receiving opening 20.

Preferably, each column 14 and 16 is formed by a U-shape which opens outwardly away from the module-receiving opening 20 and is defined by an inboard or interior wall 50 that faces inwardly toward the opening 20, and by opposing column side walls 52 and 54. The U-shape defines therein a channel 56 which extends axially along the longitudinal length of the respective columns.

Each column 14 and 16 further includes an access cover 58 so as to enclose the channel 56 on the outward side thereof. The cover 58 should be provided with removable fasteners 60 (FIGS. 2 and 3) to permit removal of the cover 58 for access to the channel 56. Each column access cover 58 is preferably formed as a plate having a width which corresponds to the distance between the column side walls 52 and 54 and has a length which extends substantially along the longitudinal length of the columns 14 and 16. The column side walls 52 and 54 and the access cover 58 thereby define an exposed exterior wall for each column.

Referring to FIGS. 4 and 5, when the columns 14 and 16 are fixedly secured to the upper portions 28 of the interior frame members 26, the channels 56 are in communication with the respective apertures 33 of the interior frame members 26 such that the channel 56 is in communication with the interior chamber 42 of the base 12 so as to permit a cable to be extended along the length of the channel 56 through the aperture 33 and into the interior chamber 42.

Each inboard wall 50 also includes a plurality of access ports 62a–62d which each open between the opening 20 and the respective channel 56. The access ports 62a–62d define a plurality of vertically adjacent mounting sites 64a–64d for the aforementioned mounting of the modules 22 or 24. As shown in FIG. 4, mounting sites 64a and 64b respectively accommodate the power module 22 and the communication module 24 whereby the unused mounting sites 64c and 64d (illustrated in phantom outline) are able to accommodate additional modules for either power or communication. While four access ports 62 are illustrated, it will be understood that any suitable number of access ports 62 may be provided along the longitudinal length of the inboard wall 50, which number may be varied for example, by varying the size of the access ports 62 or the length of the columns 14 and 16 to thereby vary the quantity of mounting sites 64.

When a particular access port 62 is not used to provide access for the wiring of a cable therethrough to an associated power module 22 or communication module 24, then the access ports 62 are preferably blocked by cover plates 66. Preferably the cover plate 66 has a rectangular shape and is removably mounted to the inboard wall 50 by the use of fastener holes 68 and appropriate fasteners (not illustrated). The fastener holes 68 are disposed proximate the side edges of each of the access ports 62.

Each inboard wall 50 also includes mounting holes 70 disposed along the axial length of the interior facing surface 50 which are used to mount covers to the modules 22 or 24. Preferably, four mounting holes 70 are formed through each interior wall 50 proximate the corners of each access port 62.

The cross member 18 extends between the distal ends 48 of the columns 14 and 16 and includes a substantially U-shaped cross section which opens upwardly and outwardly away from the opening 20. The cross member 18 is defined on three sides by a substantially horizontal downward facing interior wall 72 formed between upwardly extending cross member side walls 74. The cross member 18 includes a dividing wall 76 therein which is secured to the side walls 74 by fasteners 79 and separates the cross member 18 into a pair of interior chambers 78a and 78b. The interior chambers 78a and 78b are in communication with the channels 56 of columns 14 and 16 respectively through apertures 80 formed at the distal ends 48 of the columns 14 and 16. The cross member 18 and in particular the interior chambers 78a and 78b thereof are enclosed by a top plate 82 fixedly secured by conventional fasteners.

Figure 12:
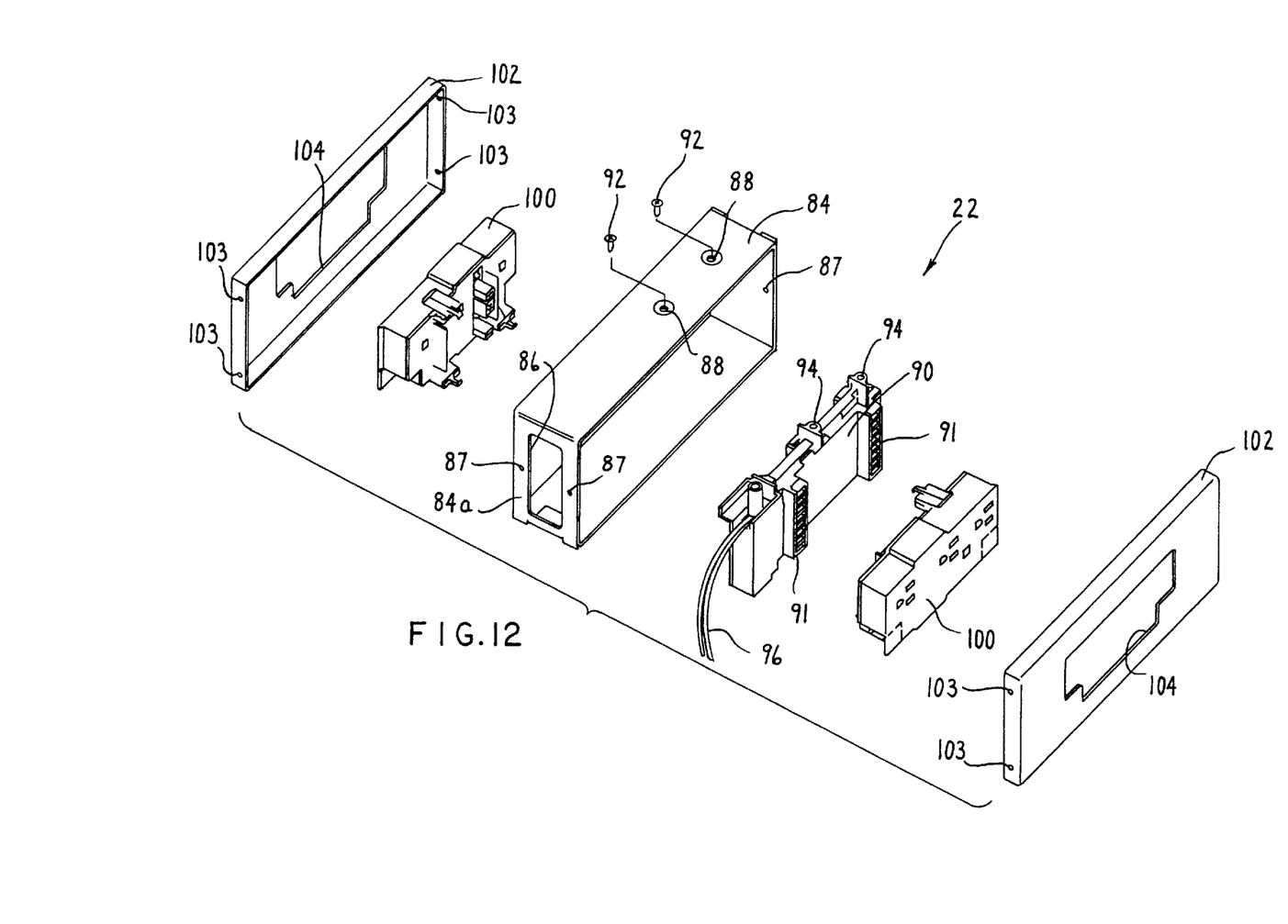
FIG. 12 is an exploded pictorial view of a power module of the invention.

Referring to FIGS. 2 and 12, each power module 22 includes a substantially rectangular boxlike housing 84 which is open on opposite sides thereof and has an access opening 86 through one end wall 84a. The access opening 86 is rectangular and located such that it will be in registry with one of the access ports 62 when the power module 22 is secured in one of the mounting sites 64. Two mounting apertures 87 are formed in each end of the box 84 and are located so as to be in registry with the fastener holes 68 when the power module 22 is disposed within a mounting site 64 and thereby permit insertion of a fastener. The box 84 also includes a pair of fastener apertures 88 through the top thereof.

Each module box 84 is open on the opposite sides so as to accommodate a power block assembly 90 (FIG. 12) therein. The power block 90 is defined by an insulative housing mounting a plurality of electrically conductive elements therein, which housing and conductive elements cooperate to define a pair of multi-contact socketlike electrical connectors 91 facing outwardly from opposite sides thereof.

The power block 90 in the illustrated embodiment is preferably an eight conductive wire system which includes three neutrals, three hots and two grounds, with the wires cooperating to define three different electrical circuits. The construction of the power block 90 and its connection to the conductive cables 96 substantially corresponds to the arrangement disclosed in U.S. Pat. No. 4,781,609 (as owned by the Assignee hereof). This power block is also substantially identical to the equivalent component associated with an electrical system sold by Haworth, Inc. under the trademark "The Power Base". Since the structure and function of the power block is well known, further detailed description thereof is believed unnecessary. While the power block 90 is depicted with the particular construction described above for illustrative purposes, it will be appreciated that other receptacle arrangements may be secured within the module box 84 as required.

The power block 90 is fixedly secured within the interior of the module box 84 by fasteners 92 which insert through the apertures 88 into corresponding bores 94 formed in the top of the power block 90. The power block 90 further includes a plurality of, preferably eight, power block wires 96 which extend through the access opening 86 and the aligned access port 62 into the channel 56 of column 16, and are connected to a power cable 98 of the building system as can be seen in FIGS. 4 and 5.

Each power module 22 also includes an electrical receptacle unit 100 engaged with either of or both sides of the power block 90. The receptacle unit 100 has, on the rear side thereof, a multi-terminal pluglike connector which is adapted to create a mechanical and electrical pluglike engagement with one of the side connectors 91 provided on the power block 90. When mounted on the power block, the exposed front face of the receptacle unit 100 has one or more conventional three-hole electrical sockets (i.e. receptacles) associated therewith, the latter accommodating therein a conventional two-prong or three-prong 110-volt electrical plug as associated with conventional electrical appliances.

The construction of the receptacle unit 100 and its cooperation with the power block 90 is also known, being disclosed in the aforesaid U.S. Pat. No. 4,781,609, and being commercially available as part of the aforesaid "The Power Base" system as sold by the Assignee hereof.

To enclose the module box 84 while maintaining access to the receptacle units 25a, two module cover plates 102 are included to enclose the open sides of the module box 84. To secure the cover plates 102 over the module box 84, each end of the cover plate 102 includes two mounting holes 103 which are located so as to be in registry with the mounting holes 70 of the columns 14 and 16 when the module box 84 is secured in place and the cover plates 102 placed thereon. Preferably, the module box 84 is first secured in the opening 20 and then the cover plates 102 are secured to the columns 14 and 16. This permits removal of the cover plates 102, for example, so as to access the receptacle units 25a, without having to remove the module boxes 84 from the mounting site 64. It will be appreciated that the module box 84 and the cover plates 102 can be formed so that the cover plates 102 are mounted directly to the module box 84.

The module cover plates 102 also include a plate opening 104 which permits access to the sockets defined in the face of the receptacle unit 25a. Preferably, this shape is generally rectangular although this shape may be varied to accommodate different types of receptacle units 25a.

The power modules 22 and particularly, the components illustrated in FIG. 12 are preferably assembled so as to define a single power module 22 which may be selectively positioned within one of the mounting sites 64 and then secured in position by fasteners. While FIG. 2 only illustrates one power module 22 secured in position, it will be understood that additional power modules 22 may be provided in any one and, if desired, in all four of the mounting sites 64a–64d to meet the needs of the particular workstations associated therewith.

When the power module 22 is secured in position in the mounting site 64a, the power block cables 96 extend through the access port 62a and into the channel 56 of the column 16. To facilitate connection of the power block cables 96 to the power cables 98 of the building, a connector block 105 is preferably secured within the channel 56. The connector block 105 includes a row of connector screws 105a for connection to the power block cables 96 and a parallel row of corresponding connector screws 105b which connect to the power cables 98. When additional power modules 22 are added, connection may be accomplished by merely connecting the power block cables 96 thereof to the appropriate connector screws 105a.

The power cable 98 extends through the apertures 33 and into the interior chamber 42. To secure the power cable 98 against movement, the aperture 33 may include a grommet 33a. In this embodiment, exiting of the base 12 occurs through a bottom surface of the base 12 with the power cable 98 typically being run through the floor to the building's electrical power system.

The communication module 24 is formed in many respects identical to the above-described power module 22, and thus a less-detailed description of the communication module 24 is only necessary. Reference numerals will be designated with primes to differentiate the structures of the communication module 24 from those of the power module 22.

The communication module 24 includes a module housing or box 84' which has an access opening (not illustrated) formed in one end wall thereof. When the module box 84' is seated in position within the arch-like opening 20, the end access opening (not illustrated) thereof is in registry with the corresponding access port 62 of the column 14. The module box 84' and the cover plates 102' are secured in the mounting sites 64a–64d in the same manner as previously described. The module cover plates 102' for the opposite sides of the box 84' include, as illustrated in FIG. 2, two openings 104'.

The two module openings 104' on each outward facing side of the communication module 24 are provided so as to accommodate receptacle units 25b and 25c which may have different types of communication jacks or plugs 106a and 106b associated therewith. As depicted in FIG. 2, the plug 106a is a female connector unit of conventional construction which typically is used for the connection of computer cables or the like. The connector jack 106b as depicted in FIG. 2 is a standard telephone jack of known construction. Each of these jacks or plugs 106a and 106b are connected to a communication cable 108 as illustrated generally in FIG. 4, which communication cable 108 comprises a plurality of conductor wires and which connections use conventional techniques.

Referring to FIG. 4, the communication cable 108 extends through the access opening 62b to the channel 56 of the column 14. By running the communication cable 108 through the column 14, it may be kept separate and shielded from the power cable 98. Preferably, the communication cable 108 extends into the interior chamber 42 of the base unit 12 and exits through the bottom thereof for connection to the communication cabling of the office building.

Figure 6:
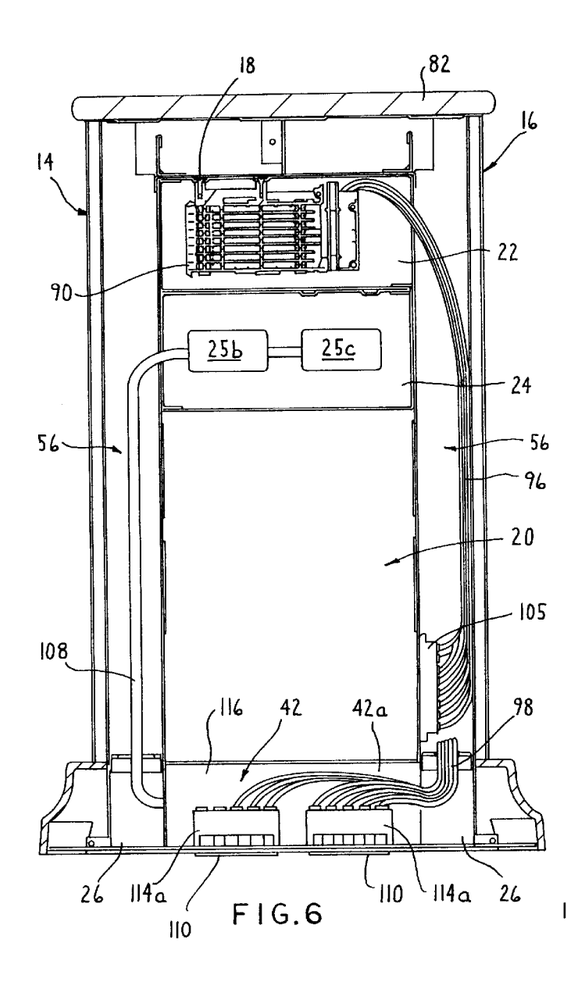
FIG. 6 is a front cross sectional view of a variation of the pedestal as viewed along line 6—6 of FIG. 7 and illustrating connector units provided within the base for connection to flat-wire power and communication cabling.
Figure 7:
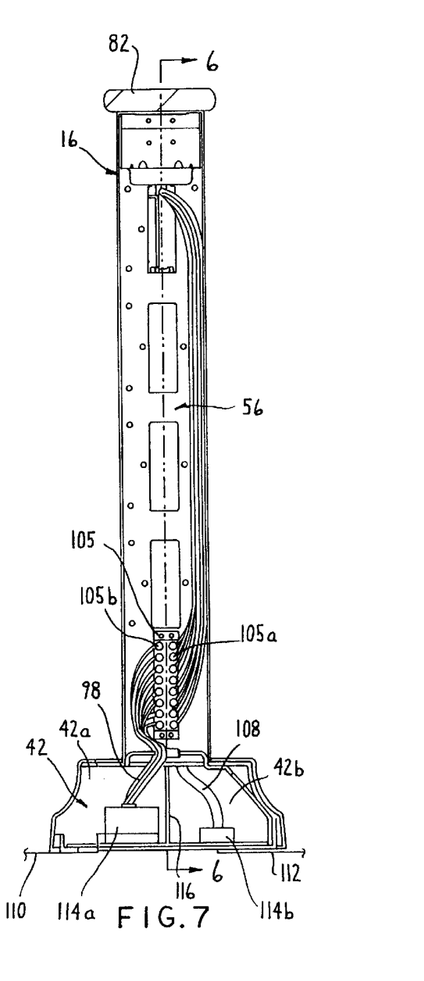
FIG. 7 is a side cross sectional view of the pedestal of FIG. 6.

Referring to FIGS. 6 and 7, a further variation 10-1 of the above-described embodiment of the pedestal 10 is illustrated for use with flat-wire power cables 110 and flat-wire communication cables 112. The pedestal 10-1. is substantially the same as the above-described pedestal 10 except for the differences discussed herein. To facilitate connection of the power cable 98 and communication cable 108, which cables extend through the pedestal 10-1 and terminate within the base 12, to the respective flat-wire power cable 110 and flat-wire communication cable 112, terminal blocks 114a and 114b are provided within the interior chamber 42 of the base 12. More specifically, two connector blocks 114a are secured within the interior chamber 42 and connected to the power cable 98 with five wires of the power cable 98 being connected to one of the terminal blocks 114a and three wires being connected to the other of the terminal blocks 114a. These terminal blocks 114a permit ready connection of the pedestal 10-1 to the flat-wire power cables 110.

As can be seen in FIG. 7, the communication cable 108 connects to the terminal blocks 114b which terminal blocks 114b can thereafter be connected to the flat-wire communication cable 112. The terminal blocks 114b, as well as 114a, are of conventional construction.

Furthermore, in this embodiment, the base 12 includes a divider wall 116 which separates the interior chamber 42 of the base 12 into two interior chambers 42a and 42b. The divider wall 116 facilitates the separation of the components dedicated to power and those components dedicated to communications.

Figure 8:
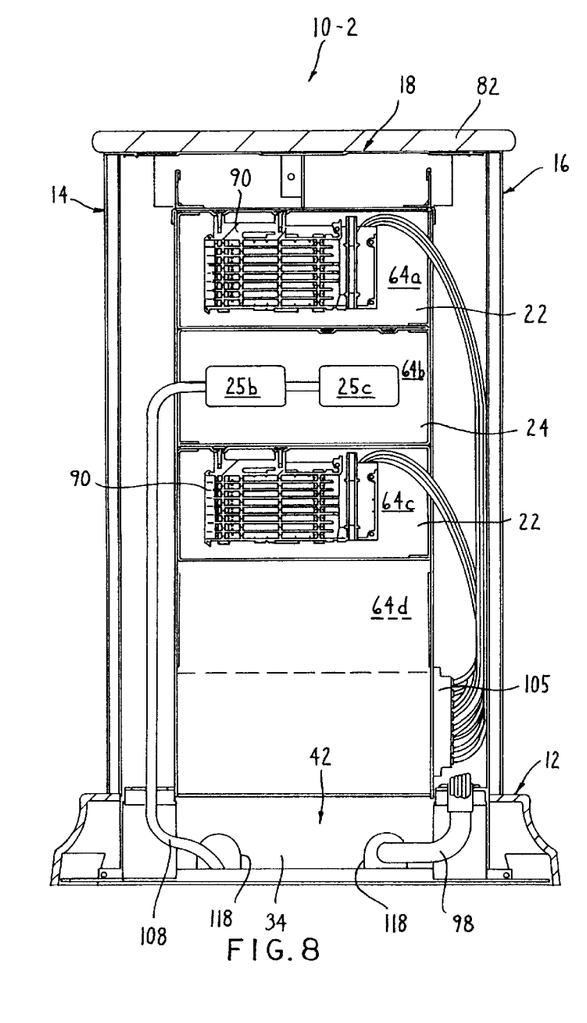
FIG. 8 is a front cross sectional view of a further variation of the pedestal as viewed along line 8—8 of FIG. 9 and illustrating the power and communication cables exiting the base through side apertures.
Figure 9:
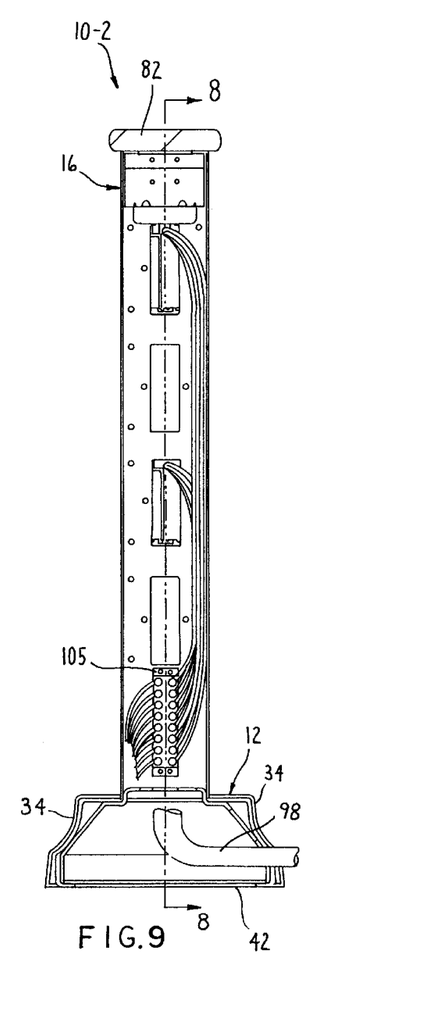
FIG. 9 is a side cross sectional view of the pedestal of FIG. 8.

Referring to FIGS. 8 and 9, a still further variation 10-2 of the above-described pedestal 10 is illustrated wherein the power cable 98 and the communication cable 108 are adapted to exit the base 12 through side apertures 118 formed through one of the base side covers 34. This permits the power and communication cabling to be extended along the floor toward a connection location, such as a floor mount power monument, and is particularly appropriate where the office configuration is frequently changed since it may be undesirable to wire the pedestal 10-2 through the floor. As can be seen, two power modules 22 can be provided in the mounting sites 64a and 64e with the communication module 24 being disposed therebetween in the mounting site 64b.

Figures 10, 11:
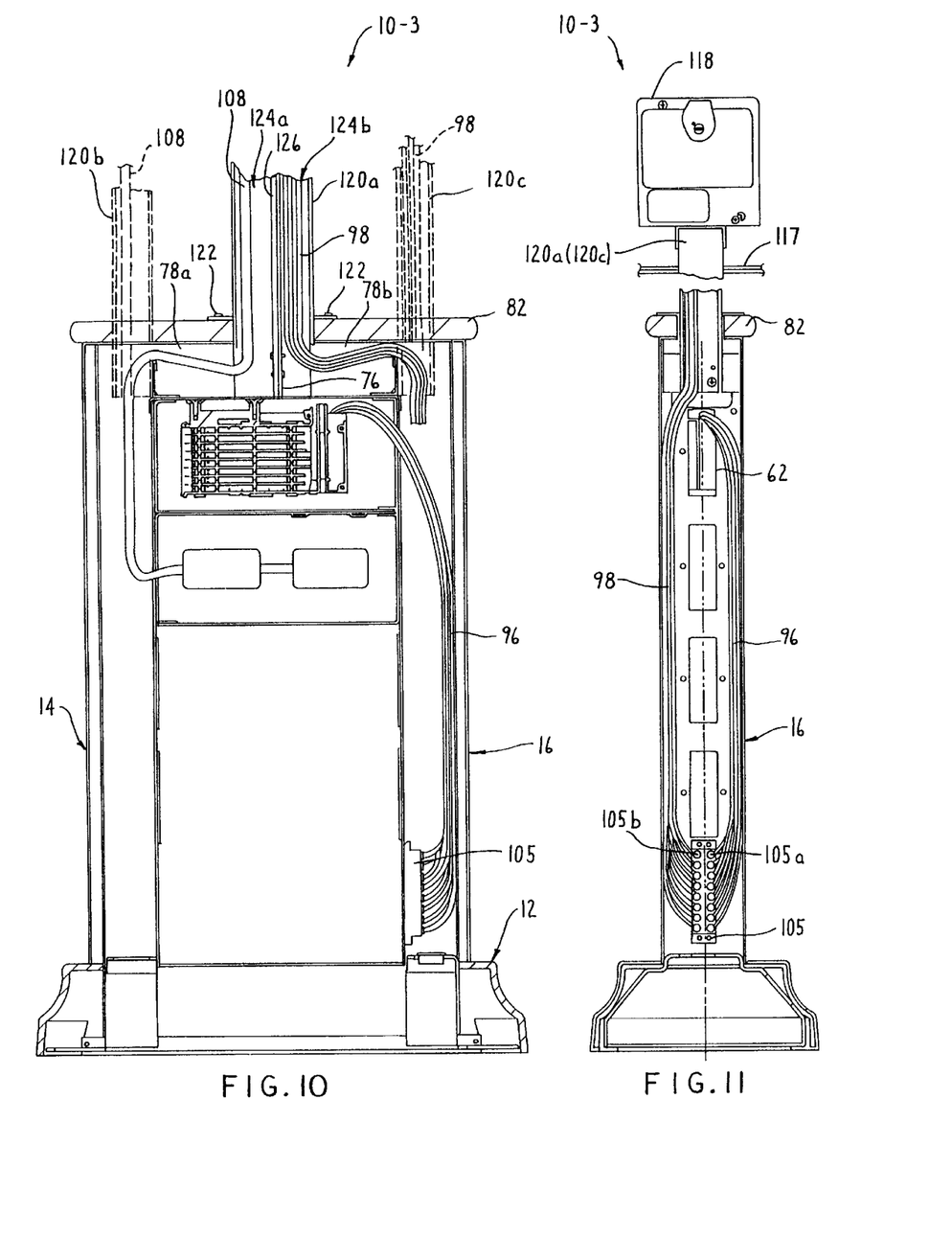
FIG. 10 is a front cross sectional view of a still further variation of the pedestal illustrating the cabling exiting through the top thereof along paths shown alternatively in solid lines and dashed lines.
FIG. 11 is a side cross sectional view of the pedestal of FIG. 10 connected to a ceiling junction box.

Referring to FIGS. 10 and 11, in a still further variation 10-3 of the pedestal 10, it may be desirable to route the cabling upwardly through a ceiling 117 to a junction box 118. In this embodiment, a top-feed conduit 120a is provided which extends vertically between the junction box 118 and the top plate 82. The top-feed conduit 120a is secured to the top plate 82 by fasteners 122 or other similar mounting means and extends into and communicates with the interior chambers 78a and 78b of the cross member 18. Preferably the top-feed conduit 120 is divided into two interior chambers 124a and 124b which are separated one from the other by a dividing wall 126, which interior chambers 124a and 124b and dividing wall 126 extend axially along the longitudinal length of the top-feed conduit 120. The dividing wall 126 is adapted to be integrally connected to the dividing wall 76 of the cross member 18, which divides the interior thereof, so as to maintain the separation of the power cables 98 from the communication cables 108.

Alternatively with respect to the embodiment illustrated in FIGS. 10 and 11, two separate top feed conduits 120b and 120c may be secured between the top plate 82 and the junction box 118 as illustrated in phantom outline in FIG. 10. This eliminates the need for a dividing wall 126 within the top-feed conduit 120. Eatch top feed conduit 120b and 120c thereby is connected to the top plate 82 and extends into a respective channel 56 of the columns 14 and 16.

In operation, the pedestal 10 typically is placed in a position located near one or more a workstation areas. Depending upon the particular needs of one or more workstations located near the pedestal 10, a suitable number of power modules 22 and/or communication modules 24 are secured within the mounting sites 64 which extend along the axial length of the columns 14 and 16. Should the needs of a particular workstation change, the pedestal 10 may be readily modified by replacing appropriate power modules 22 with communication modules 24 or vice versa. For example, should additional power modules 22 be required to provide additional outlets for the use of electrical components at the workstation, a power module 22 can be secured at an open mounting site 64a–64d and, if a particular communication module 24 is not needed, the newly required power module 22 can replace the unneeded communication module 24, or visa versa.

Depending upon the particular cabling arrangement within the building, one of the variations of the pedestal 10, 10-1, 10-2 or 10-3 will be chosen. More specifically, the pedestal of the invention may be provided with power cables 98 and communication cables 108 which exit the pedestal 10 either through the top plate 82 or through the base 12 depending upon the needs of the user.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A freestanding pedestal for providing access to power and/or communication links defined by one or more cables disposed in a workstation area, comprising:

a base for placement on a support surface near the workstation area;

first and second upright columns spaced apart one from the other which have respective first and second interior surfaces that face inwardly in opposing relation to define a module-receiving opening between said columns, a plurality of vertically adjacent mounting sites being defined in said module-receiving opening between said first and second columns;

each said column having a proximal end mounted to said base, and a distal end projecting away from said proximal end, at least one of said columns including a channel extending longitudinally within said column intermediate said proximal end and said distal end, a plurality of vertically spaced access ports being defined on at least one of said interior surfaces, one said access port corresponding to each of said mounting sites, said access ports opening through said respective interior surface between said corresponding mounting site of said module-receiving opening and said channel;

said channel of said column receiving the cable therein;

a cross member having opposite ends secured respectively to said distal ends of said first and second columns; and at least one module removably mounted to said columns at a selected one of said mounting sites and adjacent said access port corresponding thereto, each said module including opposite sides which face outwardly from said module-receiving opening to enclose said mounting site and define exposed exterior surfaces of said pedestal during use, and further including at least one receptacle disposed between said opposite sides and accessible through one of said opposite sides, said receptacle being connected to said cable through said access port adjacent thereto, said module further including opposite end faces disposed in opposing relation with said first and second interior surfaces respectively, and connectors which secure said opposite end faces to said first and second interior surfaces to support said module in said module-receiving opening.

2. The pedestal according to claim 1, wherein each of said columns defines one said channel, and at least one of said base and said cross member is hollow and has first apertures in communication with said channels and at least one second aperture opening outwardly therefrom, first and second said cables being disposed in said channels of said first and second columns respectively and said first and second cables each extending from the respective channels through said first apertures and said second aperture and to respective power and/or communication sources.

3. The pedestal according to claim 1, wherein said module includes two receptacles which extend respectively through said outward facing opposite sides so as to be accessible to provide workstation connection sites on opposite sides of said pedestal.

4. The pedestal according to claim 3, wherein a first said module is seated within said module-receiving opening and each said receptacle thereof is connected to a first said cable, and a second said module is seated within said module-receiving opening vertically adjacent said first module and each said receptacle thereof is connected to a second said cable.

5. The pedestal according to claim 4, wherein one of said base and said cross member includes two chambers separated by a dividing wall therein, said first cable being a power cable and said second cable being a communications cable, one of said chambers having said power cable extending therethrough and the other of said chambers having said communication cable extending therethrough.

6. The pedestal according to claim 4, wherein said first cable is a power cable, and said second cable is a communications cable.

7. An upright pedestal for providing access to power and/or communication links defined by first and second cables which extend from respective sources toward a workstation area, comprising:

first and second upright columns spaced apart one from the other which have respective opposing first and second inward facing surfaces that define a module-receiving opening between said columns;

each said column having a first column end, a second column end projecting away from said first column end, a channel extending longitudinally within said column intermediate said first and second column ends, and at least one access port opening through said inward facing surface and in communication with said channel to define at least one mounting site between said columns, said channel of said first column receiving one end of a first cable and said channel of said second column receiving one end of a second cable; and first and second hollow cross members vertically spaced one from the other and having opposite ends thereof connected respectively between said first column ends and between said second column ends with one of said cross members being seated upon a support surface, at least one of said cross members having first apertures in communication with said channels and second apertures opening outwardly therefrom, said first cable extending from said channel of said first column through said first and second apertures of said one cross member to a respective source, said second cable extending from said channel of said second column through said first and second apertures of said one cross member to a respective source, said one cross member including two chambers separated by a dividing wall therein, one of said chambers having said first cable extending therethrough and the other of said chambers having said second cable extending therethrough; and at least one module removably mounted between said columns in said one mounting site and adjacent said one access port, said module including opposite sides facing outwardly from said module-receiving opening, said module including at least one receptacle connected to one of said first and second cables respectively through said access port adjacent thereto, said receptacle being accessible through at least one of said opposite sides for providing at least one connector site for the workstation area.

8. The pedestal according to claim 7, wherein said module includes two receptacles which each extend respectively through one of said outward facing opposite sides so as to be accessible to provide workstation connection sites on opposite sides of said pedestal.

9. The pedestal according to claim 7, wherein a plurality of said access ports are provided to define a plurality of said mounting sites, a selected number of said modules being disposed at selected mounting sites.

10. The pedestal according to claim 9, wherein a first said module is seated within said module-receiving opening and connected to said first cable and a second said module is seated within said module-receiving opening and connected to said second cable.

11. The pedestal according to claim 7, wherein said first and second cables are power and communication cables respectively which extend through said cross member seated upon the support surface.

12. The pedestal according to claim 7, wherein said first and second cables are power and communication cables respectively which extend through said cross member vertically spaced from said support surface.

13. A freestanding pedestal for providing power and/or telecommunications connections to a workstation area comprising:

a support frame comprising a base and a pair of columns which project upwardly from said base and are laterally spaced apart so as to define an open space therebetween, each of said columns being vertically elongate and being defined on one side thereof by an inward-facing interior surface and on the remaining sides thereof by an exterior surface, said interior surfaces of said columns being in opposing relation such that said open space is defined therebetween, each said interior surface having a plurality of connecting parts spaced apart vertically along the length thereof at predetermined intervals, each one of said connecting parts corresponding to one of said connecting parts of the other of said columns so as to define a mounting location disposed therebetween in said open space, said connecting parts defining a plurality of discreet vertically adjacent mounting sites which are disposed one above the other; and a plurality of receptacle units, each of said receptacle units including a hollow housing which defines a hollow interior and a receptacle which is supported in said hollow housing and is accessible sidewardly through said housing from an exterior of said receptacle unit, each said receptacle unit being connected to a cable which extends away from said receptacle unit and including engagement means at opposite ends thereof which are releasably engagable with said connecting parts for removably mounting said receptacle unit in any one of said plurality of mounting sites, each of said receptacle units being supported by said columns in one of said mounting sites independently of the other of said receptacle units, said housing having spaced apart side walls which face sidewardly from said open area and extend between said columns, said side walls being exposed during use and said pedestal being free of covers overlying said open space to permit mounting of said receptacle units to any of said mounting sites.

14. A pedestal according to claim 13, wherein at least one of said columns defines a hollow interior, each said cable for said receptacle units extending through a respective one of said columns through said hollow interior to an exterior of said pedestal.

15. A pedestal according to claim 14, wherein said hollow interior of said column defines a first passage extending vertically through said column along each of said mounting sites, said first passage including an access port at each mounting site for permitting the passage of said cable therethrough into said first passage.

16. A pedestal according to claim 13, wherein said support frame includes a top cross member extending horizontally between upper ends of said columns, and an uppermost one of said mounting sites is disposed directly adjacent to said top cross member.

17. A freestanding pedestal for providing power and/or telecommunications connections to a workstation area comprising:

a support frame comprising a base and a pair of columns which project upwardly from said base and are laterally spaced apart so as to define an open space therebetween, each of said columns being vertically elongate and being defined on one side thereof by an interior surface and on the remaining sides thereof by an exterior surface, said interior surfaces of said columns being in opposing relation such that said open space is defined therebetween, each said interior surface having a plurality of connecting parts spaced apart vertically along the length thereof at predetermined intervals, each one of said connecting parts corresponding to one of said connecting parts of the other of said columns so as to define a mounting location disposed therebetween in said open space, said connecting parts defining a plurality of discreet vertically adjacent mounting sites which are disposed one above the other;

a plurality of receptacle units, each of said receptacle units including a receptacle which is accessible from an exterior of said receptacle unit, each said receptacle unit being connected to a cable which extends away from said receptacle unit and including engagement means at opposite ends thereof which are releasably engagable with said connecting parts for removably mounting said receptacle unit in one of said plurality of mounting sites, each of said receptacle units being supported by said columns in one of said mounting sites independently of the other of said receptacle units and said pedestal being free of covers overlying said open space to permit mounting of said receptacle units to any of said mounting sites;

said hollow interior of said column defining a first passage extending vertically through said column along each of said mounting sites, said first passage including an access port at each mounting site for permitting the passage of said cable therethrough into said first passage; and said exterior surface of said column including a removable cover enclosing at least one side of said first passage, said cover being removable to permit access to said first passage through said exterior surface when said receptacle units are mounted in said mounting sites.

18. A pedestal according to claim 17, wherein said removable cover is disposed on the side of the exterior surface which is opposite to said interior surface.

19. A freestanding pedestal for providing power and/or telecommunications connections to a workstation area comprising:

a support frame comprising a base and a pair of columns which project upwardly from said base and are laterally spaced apart so as to define an open space therebetween, each of said columns being vertically elongate and being defined on one side thereof by an interior surface wherein said interior surfaces of said columns are disposed in opposing relation such that said open space is defined therebetween, each of said columns having a respective exterior surface defining the remaining sides thereof, at least one of said columns being hollow so as to define a vertically elongate channel therein and including a vertically elongate opening through said respective exterior surface for providing access to said channel and a removable cover overlying said opening, a plurality of vertically spaced apart access ports being provided in said respective interior surface of said at least one column that is hollow so as to define a plurality of mounting sites which are disposed one above the other; and a plurality of receptacle units, each of said receptacle units including a receptacle which is accessible from an exterior of said receptacle unit, said receptacle being connected to a cable which extends away from said receptacle unit, each said receptacle unit including engagement means for removably mounting said receptacle unit in one of said plurality of mounting sites wherein said cable extends through one of said access ports corresponding to said one mounting site and into said channel whereby said removable cover is removable to provide access to said channel for routing of said cable therethrough.

20. A pedestal according to claim 19, wherein said removable cover is disposed on the side of said column opposite to said interior surface thereof.

21. A pedestal according to claim 20, wherein said base is horizontally enlarged and said columns are spaced inwardly away from a peripheral edge of said base.

22. A pedestal according to claim 19, wherein both of said columns are hollow so as to define one said channel therein, each of said interior surfaces of said columns including at least one of said access ports therethrough.

23. A pedestal according to claim 22, wherein said mounting sites are disposed vertically adjacent to each other such that said receptacles supported therein are disposed directly next to each other.

24. A freestanding power and/or communications pedestal comprising:

a horizontally enlarged base which is supported on a floor, said base being free of connections with said floor and adjacent upright structures such that said pedestal is freestanding and self-supporting and is movable to selected areas of said floor;

an open frame which is connected to said base and has a pair of columns wherein a hollow cable-storage channel is defined within one of said columns, said cable-storage channel including cabling therein, said columns projecting upwardly from said base so as to be supported on said floor by said base and being laterally spaced apart to define a receptacle-receiving open area between opposing interior sides of said columns, said open area defining a plurality of mounting sites which are disposed one above the other, said one of said columns including at least one outer open side to permit access to said cable storage channel for laying said cabling therein and a removable cover which prevents access to said cabling through said open side; and at least one modular receptacle which mounts to said frame within one of said plurality of mounting sites, said receptacle having a receptacle housing which is disposed in said open area between said columns and a power and/or communications outlet which is accessible from an exterior of said receptacle housing, said outlet being connected to said cabling through said interior side of said one of said columns.

25. A pedestal according to claim 24, wherein a periphery of said base is disposed outwardly from said columns to define an enlarged bottom surface which is supported on said floor.

26. A pedestal according to claim 24, wherein said open area of said frame is free of covers and is open in the mounting sites which do not have one of said receptacles therein.

27. A pedestal according to claim 24, wherein said open side is defined through a side wall of said frame and said removable cover is connected to said frame.

* * * * *